US007016614B1

(12) United States Patent
Kajiya et al.

(10) Patent No.: US 7,016,614 B1
(45) Date of Patent: Mar. 21, 2006

(54) OPTICAL WAVELENGTH DIVISION MULTIPLEXING TRANSMISSION SUPPRESSING FOUR-WAVE MIXING AND SPM-GVD EFFECTS

(75) Inventors: Satoshi Kajiya, Tokyo (JP); Katsuhiro Shimizu, Tokyo (JP); Yukio Kobayashi, Tokyo (JP); Takashi Mizuochi, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 770 days.

(21) Appl. No.: 09/723,292

(22) Filed: Nov. 28, 2000

(30) Foreign Application Priority Data

Nov. 29, 1999 (JP) ................................ 11-337937

(51) Int. Cl.
*H04B 10/00* (2006.01)

(52) U.S. Cl. ....................... 398/173; 398/178; 398/180

(58) Field of Classification Search ................. 398/81, 398/98, 104, 105, 147, 148, 173–181

See application file for complete search history.

(56) References Cited

U.S. PATENT DOCUMENTS 4,560,246 A * 12/1985 Cotter ......................... 385/27
5,170,273 A * 12/1992 Nishio ......................... 398/48
5,438,445 A * 8/1995 Nakano ....................... 398/83
5,442,476 A * 8/1995 Yamazaki et al. .......... 398/147
5,629,994 A * 5/1997 Huber et al. .................. 385/24
5,657,144 A * 8/1997 Tanaka et al. ................ 398/48
5,696,614 A * 12/1997 Ishikawa et al. ............. 398/81
5,717,795 A * 2/1998 Sharma et al. ................ 385/24
5,781,673 A * 7/1998 Reed et al. .................... 385/24
5,786,916 A * 7/1998 Okayama et al. ............. 398/48
5,894,362 A * 4/1999 Onaka et al. ................. 398/95
6,005,698 A * 12/1999 Huber et al. .................. 398/50
6,115,173 A * 9/2000 Tanaka et al. .............. 359/333
6,118,561 A * 9/2000 Maki ............................ 398/1
6,188,511 B1 * 2/2001 Marcenac et al. .......... 359/344
6,188,823 B1 * 2/2001 Ma ........................... 385/123
6,285,480 B1 * 9/2001 H.o slashed.rlyck ........... 398/9
6,304,348 B1 * 10/2001 Watanabe ...................... 398/9
6,377,375 B1 4/2002 Taga et al.
6,445,473 B1 * 9/2002 Suemura et al. .............. 398/48
6,469,813 B1 * 10/2002 Leclerc et al. ................ 398/79

FOREIGN PATENT DOCUMENTS

EP 0 703 680 A2 3/1996
JP 07-107069 4/1995
JP 08-97771 4/1996
JP 09-247091 9/1997

OTHER PUBLICATIONS

F. Forghieri, R. W. Tkach, A. R. Chraplyvy, and D. Marcuse, "Reduction of Four-Wave Mixing Crosstalk in WDM Systems Using Unequally Spaced Channels," *8342 IEEE Photonics Technology Letters*, (Jun. 6, 1994), No. 6, New York, US.

* cited by examiner

*Primary Examiner*—Agustin Bello
(74) *Attorney, Agent, or Firm*—Birch, Stewart, Kolasch & Birch, LLP

(57) ABSTRACT

An optical repeater is provided between a first optical fiber transmission path and a second optical fiber transmission path having a zero-dispersion wavelength different from the first optical fiber transmission path. This optical repeater wave-converts a wavelength division multiplex signal input from the first optical fiber transmission path with respect to respective wavelengths thereof, and outputs the wave-converted signal to the second optical fiber transmission path.

25 Claims, 17 Drawing Sheets

1
5
6
7
λ1, λ2, · · · , λn
WAVELENGTH SELECTOR
λ1
WAVELENGTH CONVERTER
λ1'
λ2
WAVELENGTH CONVERTER
λ2'
λn
WAVELENGTH CONVERTER
λn'
WAVE COMBINER
λ1', λ2', · · · , λn'
CONTROL SIGNAL 1
2
3
λ1,λ2,・・・,λn
λ0
λ0'
λ1',λ2',・・・,λn'

ZERO-DISPERSION WAVELENGTH
λ0
CH1
CH2
CH3
CHn-1
CHn
Δλ
Δλ
Δλ
λ1
λ2
λ3
λn-1
λn
WAVELENGTH

ZERO-DISPERSION WAVELENGTH
λ0'
λ0
CH1
CH2
CH3
CHn-1
CHn
Δλ
Δλ
Δλ
λ1'
λ2'
λ3'
λn-1'
λn'
WAVELENGTH

11
λ1, λ2, · · · , λn
4
WAVE DIVIDER
5
WAVELENGTH SELECTOR
λ1
λ2
λn
6
WAVELENGTH CONVERTER
CONTROL SIGNAL
λ1'
λ2'
λn'
7
WAVE COMBINER
λ1', λ2', · · · , λn'

21
4
WAVE DIVIDER
5
WAVELENGTH SELECTOR
6
WAVELENGTH CONVERTER
7
WAVE COMBINER
8
λ1, λ2, . . . , λn
λ1
λ2
λn
λ1'
λ2'
λn'
λ1', λ2', . . . , λn
CONTROL SIGNAL

61
λ1, λ2, · · ·, λn
4
WAVE DIVIDER
5
WAVELENGTH SELECTOR
λ1
λ2
λn
6
WAVELENGTH CONVERTER
CONTROL SIGNAL
λ1'
λ2'
λn'
8
7
WAVE COMBINER
λ1', λ2', · · ·, λn'

111
OPTICAL SIGNAL λi
12
LIGHT SOURCE
λP
13
15
SOA
14
OPTICAL SIGNAL λi'

ZERO-DISPERSION WAVELENGTH
λ0
CH1 CH2 CH3 CHn-1 CHn
Δλ Δλ Δλ
λ1 λ2 λ3 λn-1 λn
WAVELENGTH

ZERO-DISPERSION WAVELENGTH
λ0 λ0'
CH1 CH2 CH3 CHn-1 CHn
Δλ1 Δλ2 Δλn-1
λ1' λ2' λ3' λn-1' λn'
WAVELENGTH

ZERO-DISPERSION WAVELENGTH
λ0
CH1
CH2
CH3
CHn-1
CHn
Δλ1
Δλ2
Δλn-1
λ1
λ2
λ3
λn-1
λn
WAVELENGTH

ZERO-DISPERSION WAVELENGTH
λ0'
λ0
CH1
CH2
CH3
CHn-1
CHn
Δλ
Δλ
Δλ
λ1'
λ2'
λ3'
λn-1'
λn'
WAVELENGTH

ZERO-DISPERSION WAVELENGTH
λ0
CH1
CH2
CH3
CHn-1
CHn
Δλ
Δλ
Δλ
λ1
λ2
λ3
λn-1
λn
WAVELENGTH

ZERO-DISPERSION WAVELENGTH
λ0'
λ0
CH1
CH2
CH3
CHn-1
CHn
Δλ'
Δλ'
Δλ'
λ1'
λ2'
λ3'
λn-1'
λn'
WAVELENGTH

ZERO-DISPERSION WAVELENGTH
λ0
CH1
CH2
CH3
CHn-1
CHn
Δλ
Δλ
Δλ
λ1
λ2
λ3
λn-1
λn
WAVELENGTH

ZERO-DISPERSION WAVELENGTH
λ0'
λ0
CH1
CHn
Δλ
Δλ
Δλ
λ1
λn
WAVELENGTH

OPTICAL WAVELENGTH DIVISION MULTIPLEXING TRANSMISSION SUPPRESSING FOUR-WAVE MIXING AND SPM-GVD EFFECTS

FIELD OF THE INVENTION

The present invention in general relates to an optical transmission system. More particularly, this invention relates to an optical wavelength division multiplexing transmission system.

BACKGROUND OF THE INVENTION

In recent years, with still more expanding expectations for development of an optical communication technique to provide high bit rates, large capacity transmission path as an infrastructure of the information-oriented society, there have been promoted global and vigorous researches and developments of high rate, large capacity optical communication systems.

On land, an optical wavelength division multiplexing transmission system of a 10 Gb/s transmission rate using a transmission path of a 1.3 μm band single mode fiber (SMF) and a 1.55 μm band dispersion shift fiber (DFS) has come into practice.

Under the ocean, on the other hand, an optical wavelength division multiplexing transmission system of a 10 Gb/s transmission rate using a transmission path of a non-zero dispersion shift fiber having a zero-dispersion wavelength at a 1.58 μm band has come into practice.

Generally, a transmission waveform deterioration occurs in the optical fiber due to interaction (called SPM-GVD effect) between a self-phase modulation (SPM) and a group-velocity dispersion (GVD). Therefore, a possibly smaller value should be set as a value of the (group-velocity) dispersion to be caused by a difference in transmission time in optical fiber between optical signals of different wavelength.

However, as the wavelengths of the optical signals approach a zero-dispersion wavelength, there is an increased tendency for a four-wave mixing (FWM) to cause a crosstalk, with an increased deterioration of transmission characteristic. Therefore, the optical wavelength division multiplexing transmission requires a wavelength layout in consideration of a zero-dispersion wavelength of optical fiber.

An optical wavelength division multiplexing transmission system is disclosed in Japanese Patent Application Laid-Open Publication No. 8-97771. This conventional system uses a transmission path of a 1.55 μm band dispersion shift fiber (DSF), in which the effect of a conventional four-optical-wave mixing is suppressed.

FIG. 17 is a graph describing the principle of the conventional system, in which signals of respective wavelengths are subject to a wavelength conversion for an interchange between wavelengths to make the optical level of crosstalk lower than specified.

At present, if two different networks (transmission paths), such as for land use and submarine use, are to be connected at a connection point therebetween, then the two different networks are electrically terminated. However, it is necessary for aiming at a practical low-cost system to implement a connection-less simplified structure for structural integration of two networks.

In the conventional system, however, optical fibers in use have different zero-dispersion wavelengths, and a direct use for transmission accompanies a crosstalk due to the SPM-GVD effect or FWM, as a significant problem.

SUMMARY OF THE INVENTION

The optical wavelength division multiplexing transmission system according to the present invention comprises a first optical fiber transmission path for a wavelength division multiplex signal to be input therefrom, a second optical fiber transmission path having a zero-dispersion wavelength different from the first optical fiber transmission path, and an optical repeater in which the wavelength division multiplex signal input from the first optical fiber transmission path is wavelength-converted with respect to respective wavelengths thereof, for an output thereof to the second optical fiber transmission path.

Other objects and features of this invention will become apparent from the following description with reference to the accompanying drawings.

DESCRIPTION OF THE PREFERRED EMBODIMENTS

Preferred embodiments of the present invention are explained below with reference to the accompanying drawings.

Figure 1:
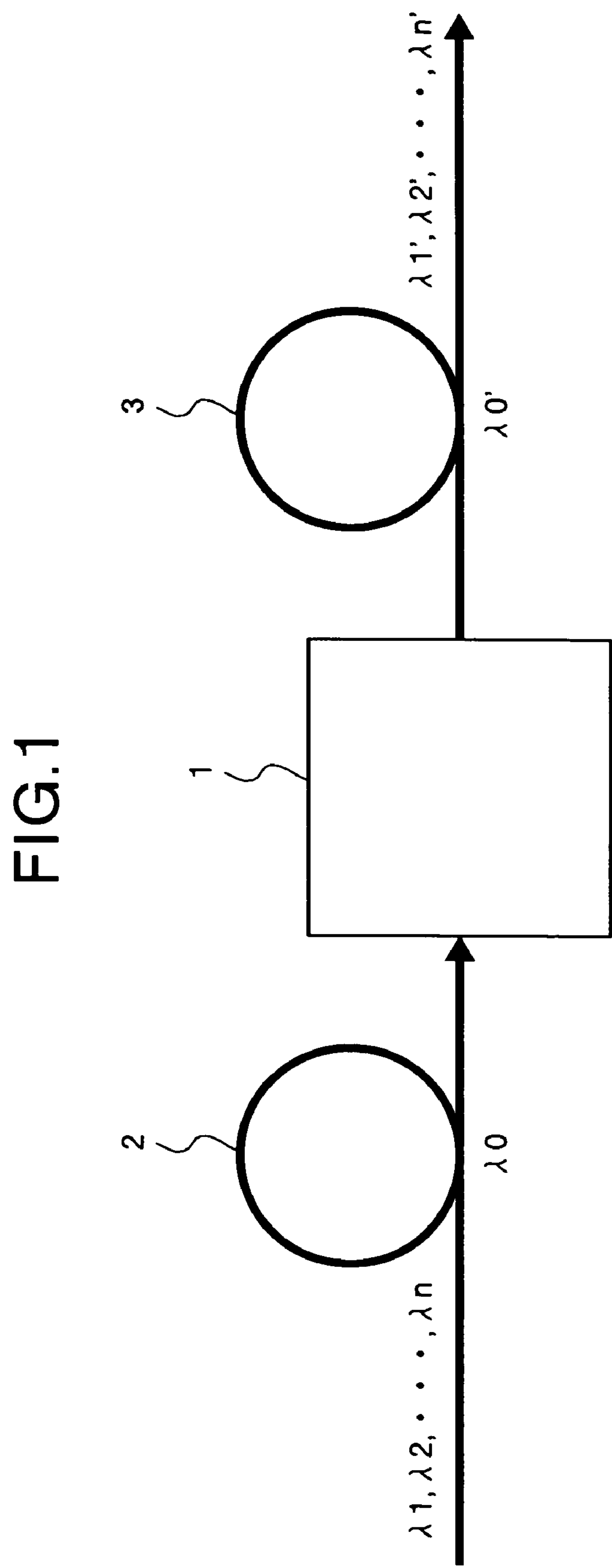
FIG. 1 is a block diagram of an arrangement according to a first embodiment of the invention.

FIG. 1 shows a network arrangement according to a first embodiment of the invention. Legend 1 denotes an optical repeater having a wavelength converter, legend 2 denotes an optical fiber having a zero-dispersion wavelength λ0, and legend 3 denotes an optical fiber having a zero-dispersion wavelength λ0'.

Figures 2A, 2B:
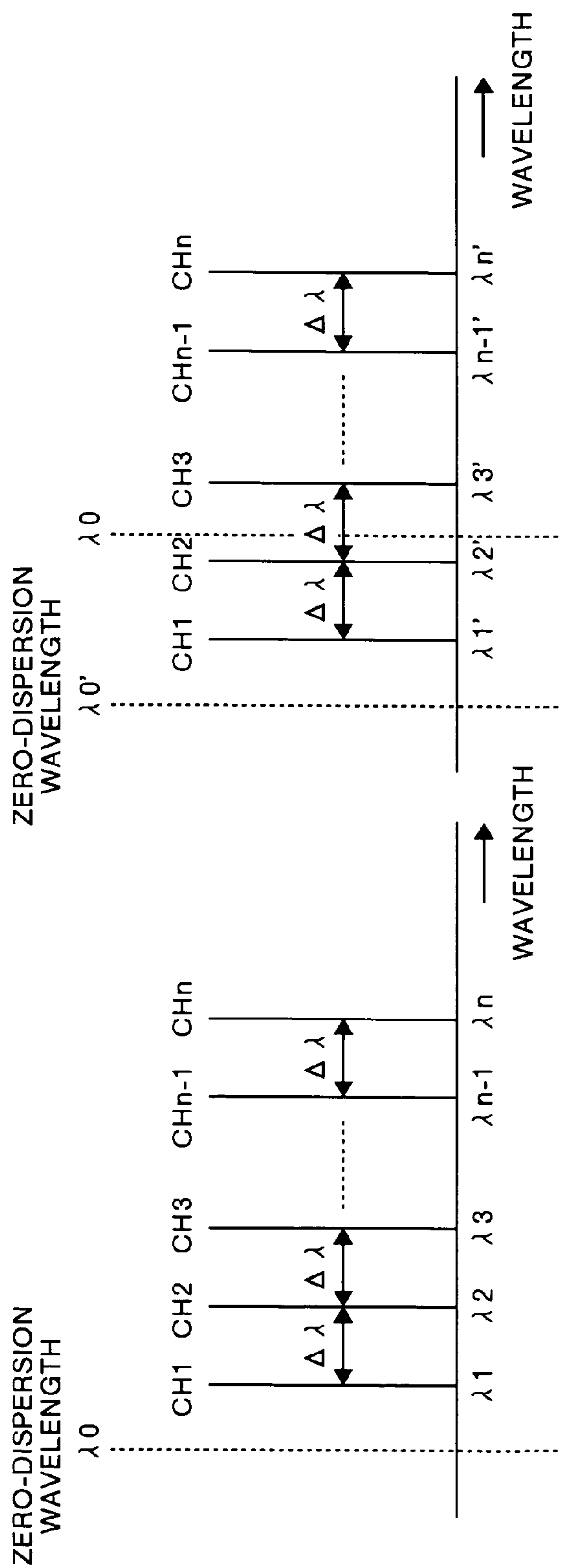
FIG. 2A is a graph of wavelength layout at an input side of the first embodiment and FIG. 2B is a graph of wavelength layout at an output side of the first embodiment.

FIG. 2A and FIG. 2B show examples of wavelength layout according to this embodiment. FIG. 2A is a graph of wavelength layout of an optical input signal in the optical repeater 1. Relative to the zero-dispersion wavelength λ0 of the optical fiber 2, n waves λ1 to λn are laid out so that the SPM-GVD effect and FWM of their wavelengths are minimized.

FIG. 2B is a graph of wavelength layout of an optical output signal in the optical repeater 1. At the optical fiber 3, this signal is wavelength-converted so as to minimize the SPM-GVD effect and FWM relative to the zero-dispersion wavelength λ0', and is output.

Figure 3:
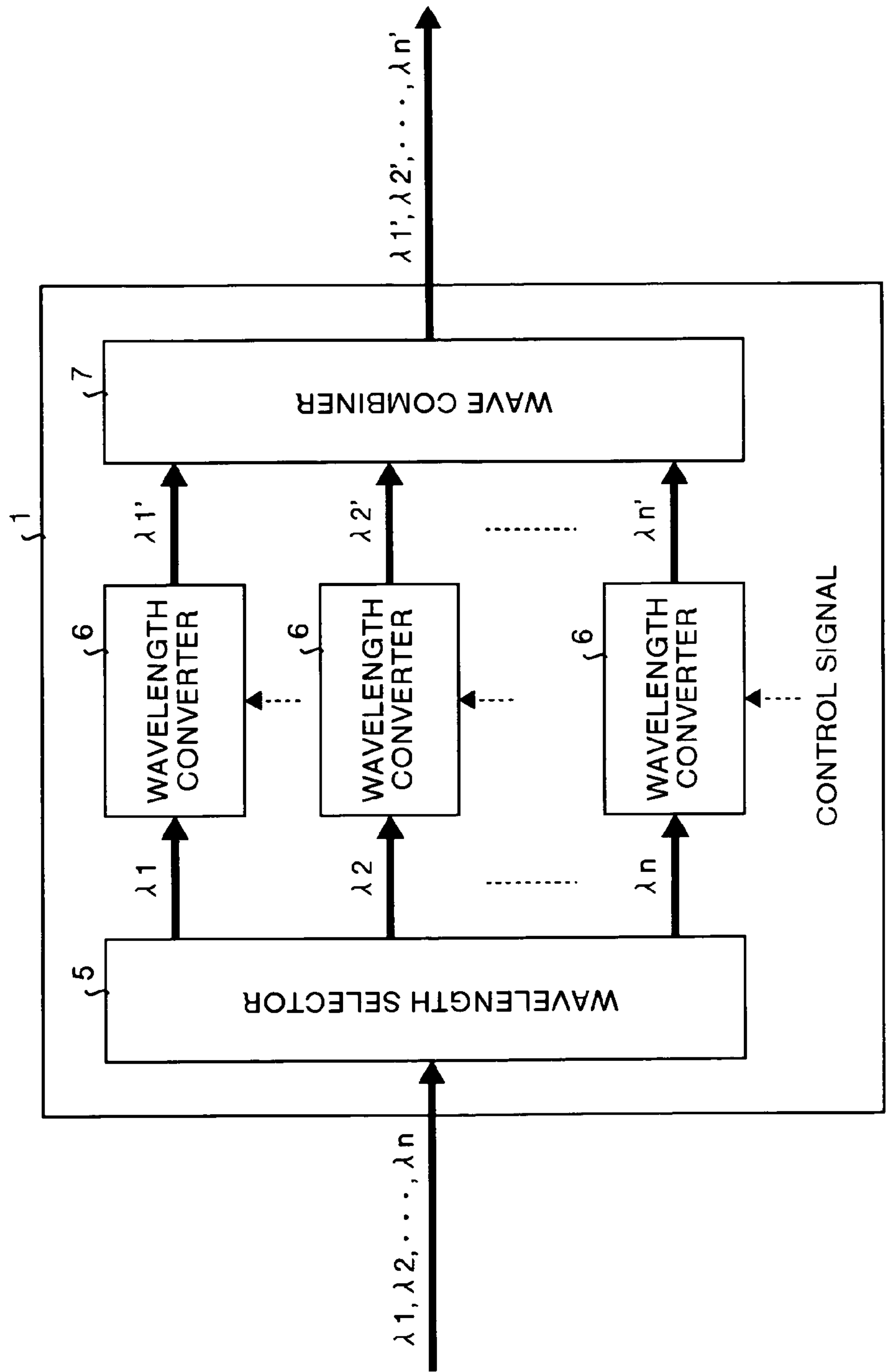
FIG. 3 is a block diagram of an optical repeater 1 according to the first embodiment.

FIG. 3 shows an arrangement of an optical repeater 1 according to the first embodiment. Legend 5 denotes a wavelength selector, legend 6 denotes a wavelength converter, and legend 7 denotes a wave combiner. The wavelength selector 5 and the wave combiner 7 can be constituted with ease by an optical filter and a photo-coupler, respectively.

The optical repeater 1 operates as explained next. An optical signal with multiplexed wavelengths λ1 to λn is input into the wavelength selector 5. The wavelength selector 5 separates the received multiplexed wavelengths λ1 to λn into optical signals by the wavelengths λ1 to λn and supplies the separated wavelength to the wavelength converters 6.

Based on a control signal, the wavelength converters 6 respectively convert the wavelengths, such that λ1 into λ1' and λ2 into λ2' etc. The wavelength converters 6 provide the converted wavelengths to the wave combiner 7. The wave combiner combines the wavelengths λ1', λ2', . . . , λn' and outputs the result.

Thus, a connection-less simplified structure can be implemented for structural integration of the two networks (transmission paths).

As explained above, the optical repeater 1 is provided between the first optical fiber transmission path 2 and the second optical fiber transmission path 3, wherein the second optical fiber transmission path 3 has a zero-dispersion wavelength different from the first optical fiber transmission path 2. This optical repeater 1 wavelength-converts with respect to respective wavelengths a wavelength division multiplex signal input from the first optical fiber transmission path 2, and output the result to the second optical fiber transmission path 3. Therefore, the SPM-GVD effect and FWM in the second optical fiber transmission path 3 are minimized, thereby implementing a connection-less simplified structure for structural integration of the two networks (transmission paths).

Figure 4:
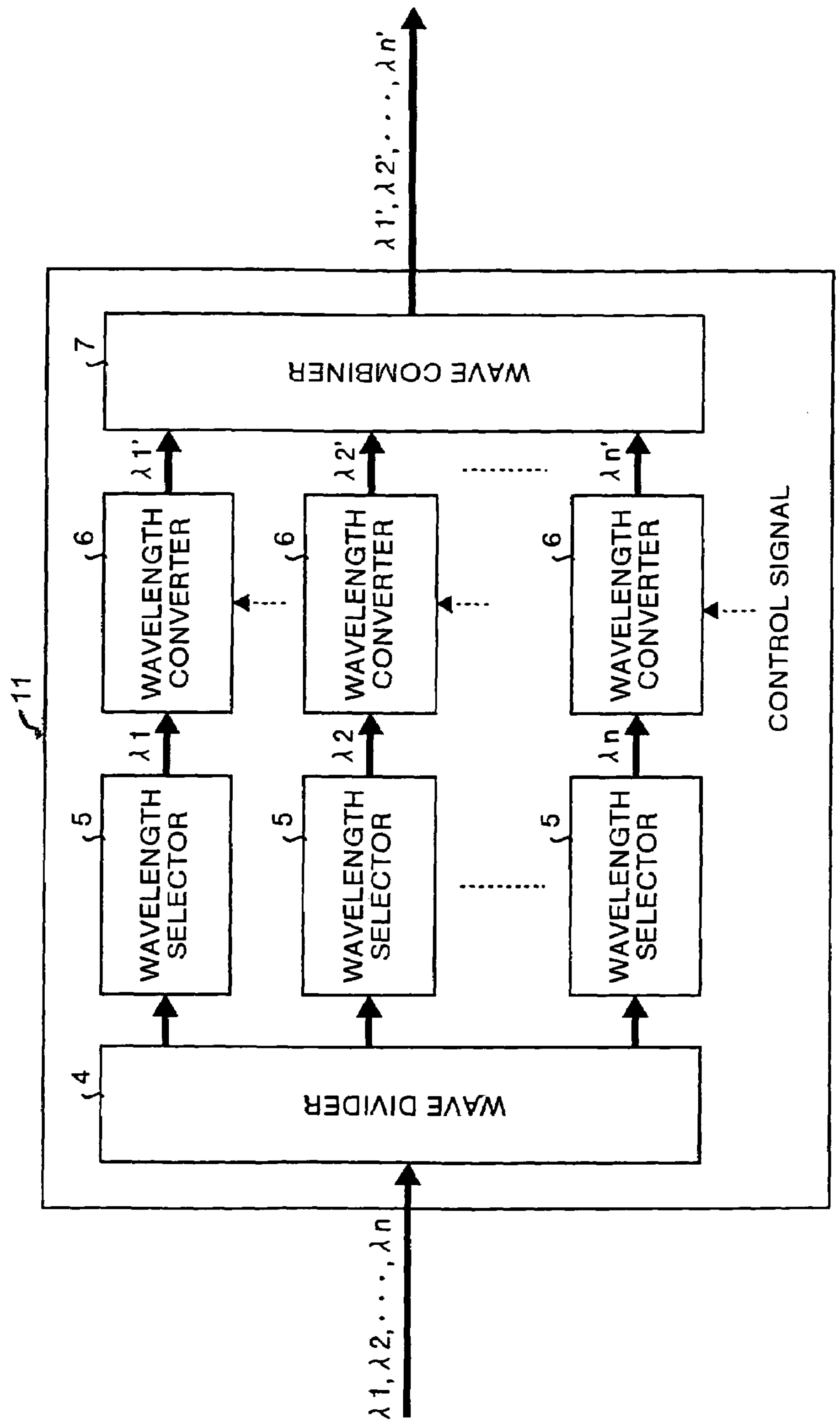
FIG. 4 is a block diagram of an optical repeater 11 according to a second embodiment of the invention.

FIG. 4 shows an optical repeater 11 according to a second embodiment. In this optical repeater 11, a wave divider 4 and wavelength selectors 5 are provided in place of the wavelength selector 5 in the first embodiment shown in FIG. 3. The wave divider 4 may be, for example, a photo-coupler.

An optical signal with multiplexed wavelengths λ1, λ2, . . . , λn is input to the wave divider 4, wherefrom optical signals of all channels are likewise output to be sent to the wavelength selectors 5, where they have their wavelengths λ1, λ2, . . . , λn selected, to be sent to wavelength converters 6. Thereafter, actions are like the case of FIG. 3.

Thus, with the second embodiment, a connection-less simplified structure can be implemented for structural integration of the two networks (transmission paths).

Figure 5:
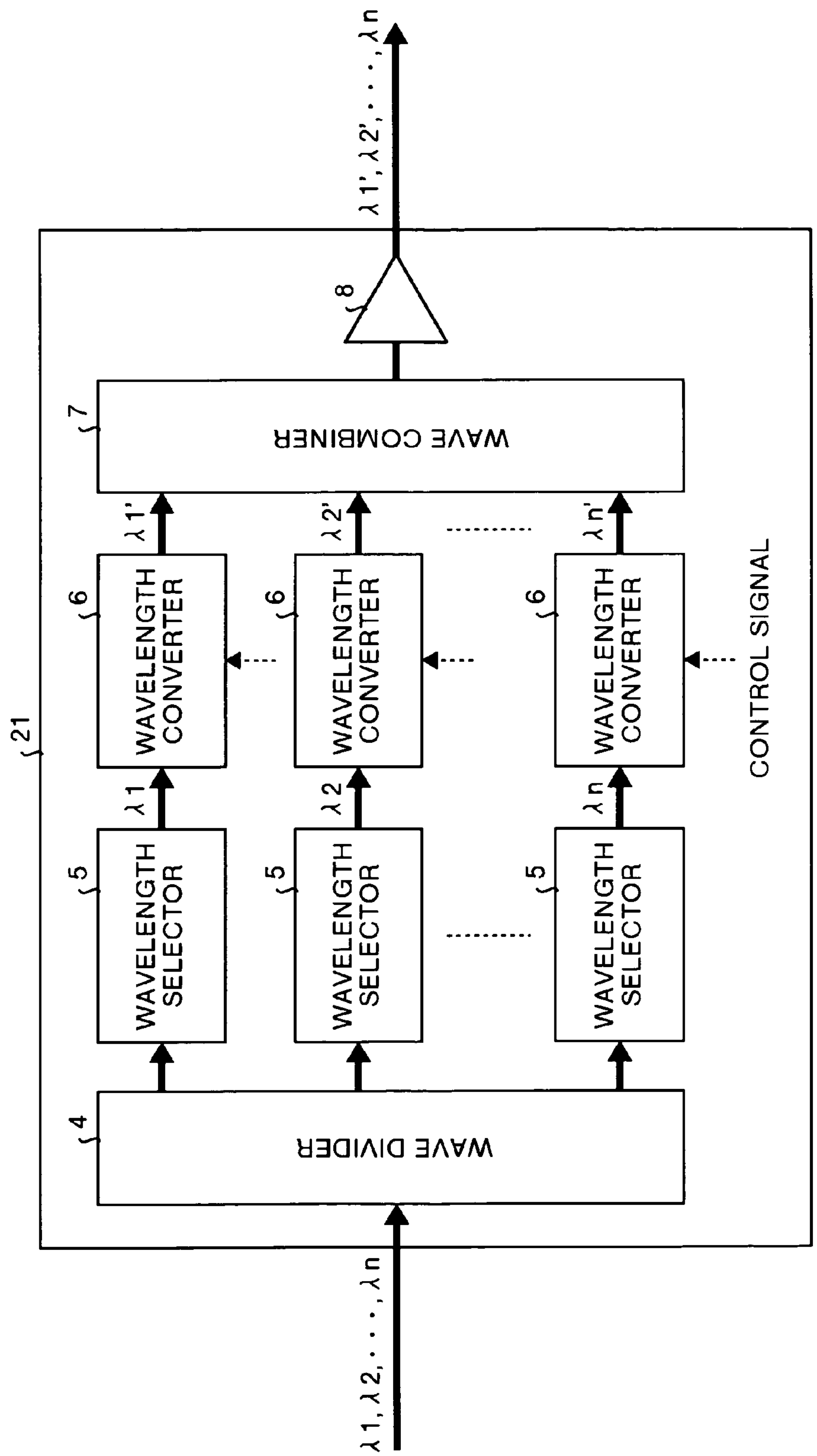
FIG. 5 is a block diagram of an optical repeater 21 according to a third embodiment of the invention.

FIG. 5 shows an optical repeater 21 according to a third embodiment. In this optical repeater 21, an optical amplifier 8 is provided after the wave combiner 7. This optical amplifier 8 compensates the loss at the wavelength converters 6, and also performs the optical amplification wave combining.

Figure 6:
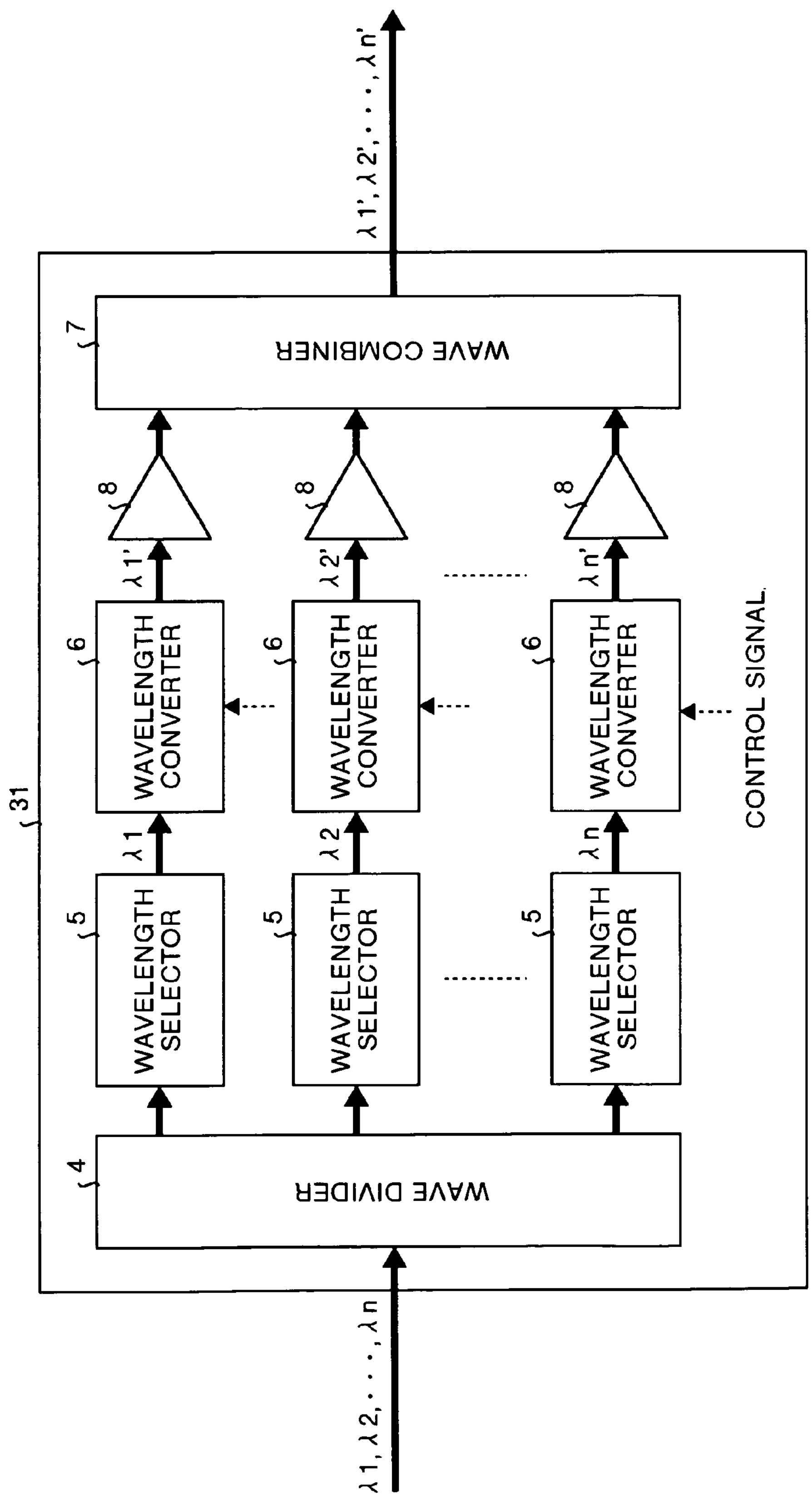
FIG. 6 is a block diagram of an optical repeater 31 according to a fourth embodiment of the invention.

FIG. 6 shows an optical repeater 31 according to a fourth embodiment. In this optical repeater 31, the optical amplifier 8 is provided between every wavelength converter 6 and the wave combiner 7. Accordingly, amplification can be effected an even level.

Because the optical amplifier 8 is inserted after every wavelength converter 6, the gain of each optical amplifier 8 is individually adjustable depending on a wavelength conversion efficiency of associated wavelength, thereby permitting compensation of an optical loss.

Figure 7:
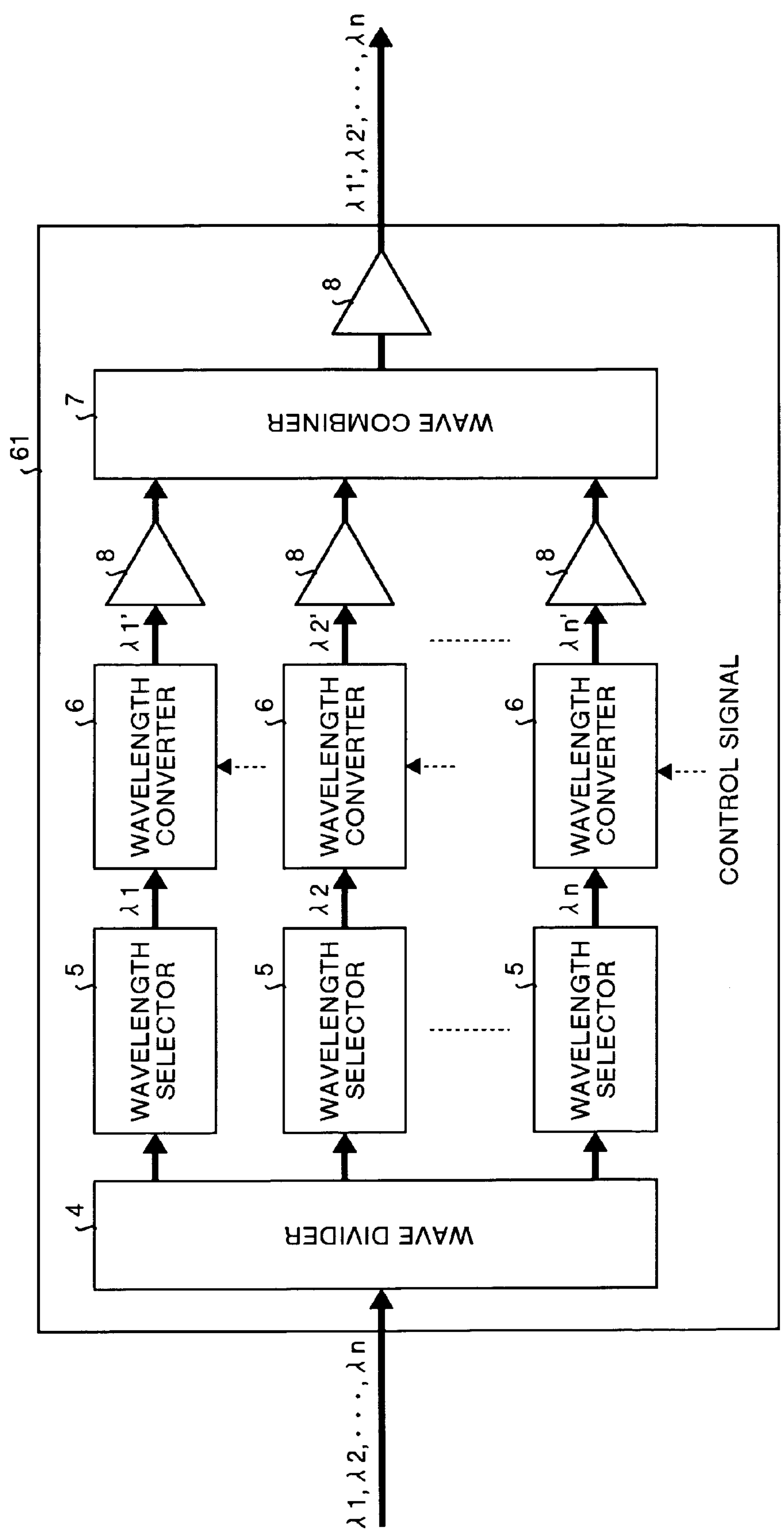
FIG. 7 is a block diagram of another optical repeater 61 according to the fourth embodiment.

The compensation may preferably be effected of both transmission path loss and wavelength conversion loss, as shown in the optical repeater 61 in FIG. 7.

Figure 8:
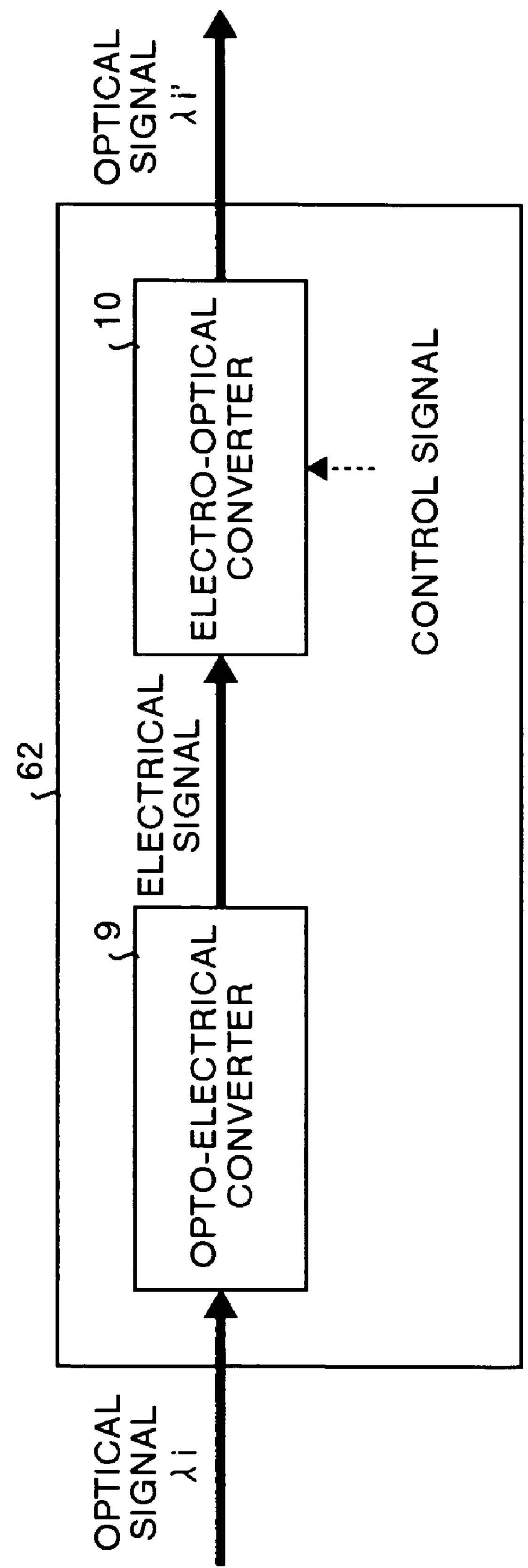
FIG. 8 is a block diagram of a wavelength converter 62 according to a fifth embodiment of the invention.

FIG. 8 shows a wavelength converter 62 according to a fifth embodiment. This wavelength converter 62 may be used in place of the wave converters 6 in any of the first to fourth embodiments. The wavelength converter 62 comprises an opto-electrical converter 9 and an electro-optical converter 10. The opto-electrical converter 9 converts an input optical signal of wavelength λi into an electrical signal. The electro-optical converter 10, based on the control signal, converts the electrical signal into an optical signal of wavelength λi'.

The opto-electrical converter 9 may be a photo-diode, avalanche photo-diode, photo-counter, etc. The electro-optical converter 10 can be constituted with ease by use of a semiconductor laser.

Figure 9:
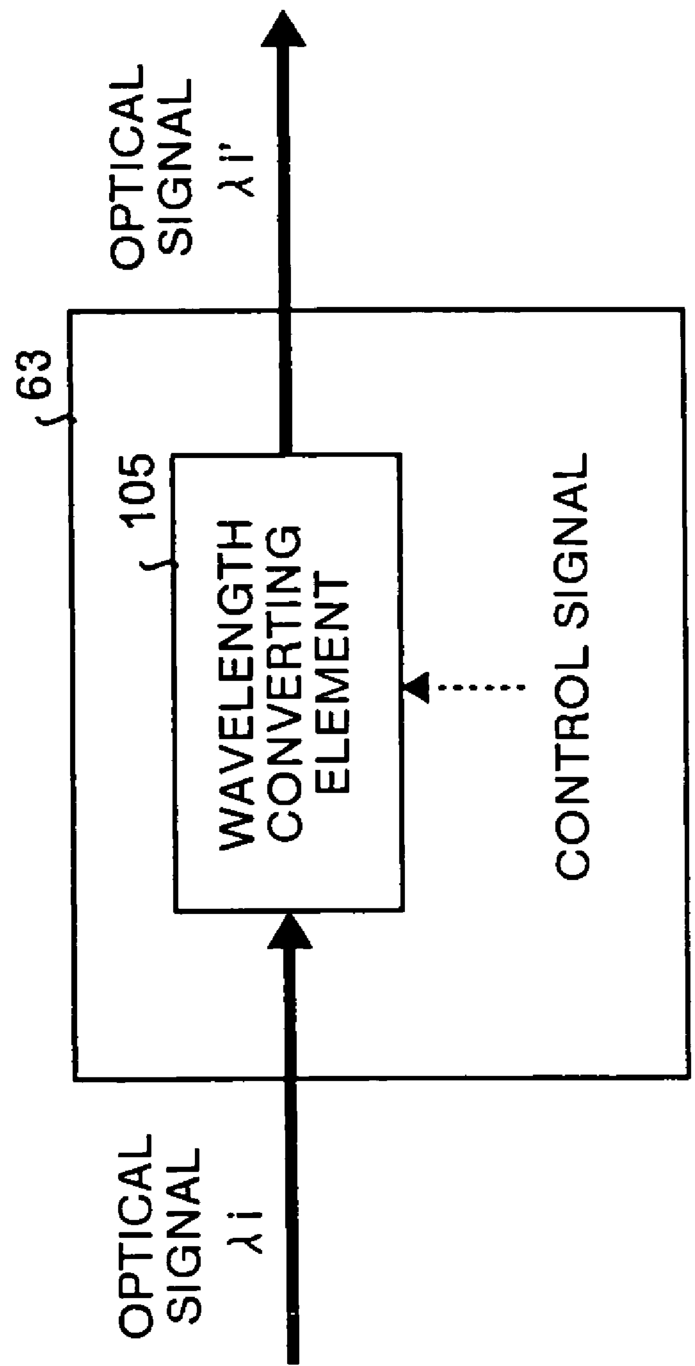
FIG. 9 is a block diagram of a wavelength converter 63 according to a sixth embodiment of the invention.

FIG. 9 shows a wavelength converter 63 according to a sixth embodiment. This wavelength converter 63 may be used in place of the wave converters 6 in any of the first to fourth embodiments. The wavelength converter 63 comprises a wavelength converting element 105 operative with a control signal to have a non-linear optical effect for converting an input optical signal λi into another wavelength λi'. The wavelength converting element 105 may be a semiconductor optical amplifier, electric field absorption type modulator, optical fiber, or the like.

Figure 10:
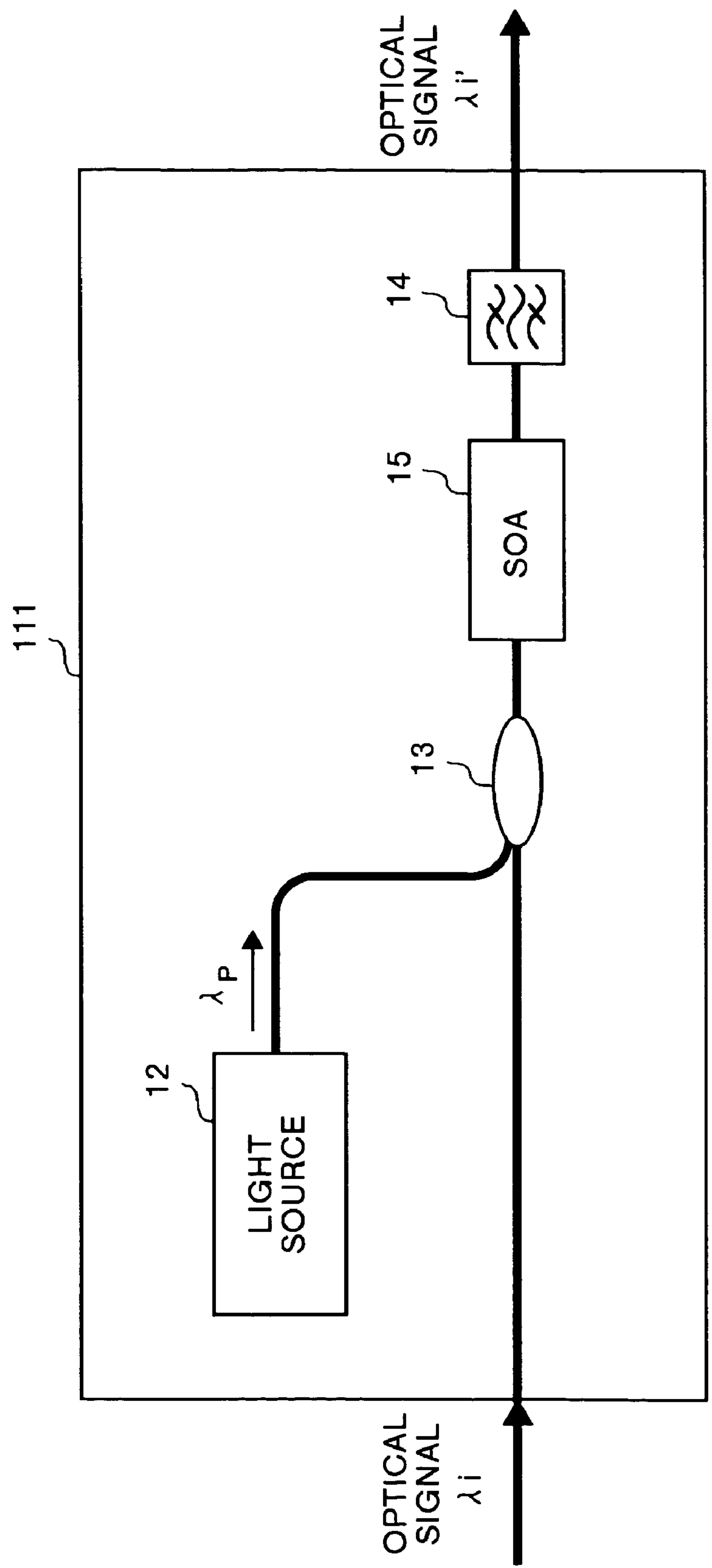
FIG. 10 is a block diagram of a wavelength converting element 111 according to a seventh embodiment of the invention.

FIG. 10 shows the wavelength converting element 111, that uses a semiconductor optical amplifier, according to a seventh embodiment. This wavelength converting element 111 may be used in place of the wavelength converting element 11 in the sixth embodiment.

Legend 12 denotes a light source, legend 13 denotes a photo-coupler, legend 14 denotes an optical filter, and legend 15 denotes the semiconductor optical amplifier. An optical signal (wavelength: λi) and pump light (wavelength: λp) are combined in the photo-coupler 13, to strike the semiconductor optical amplifier 15, which then generates a new wavelength-converted optical signal (wavelength: λi') by way of a four-wave mixing. Only the wavelength-converted optical signal is filtered by the optical filter 14, to be output.

Figure 11:
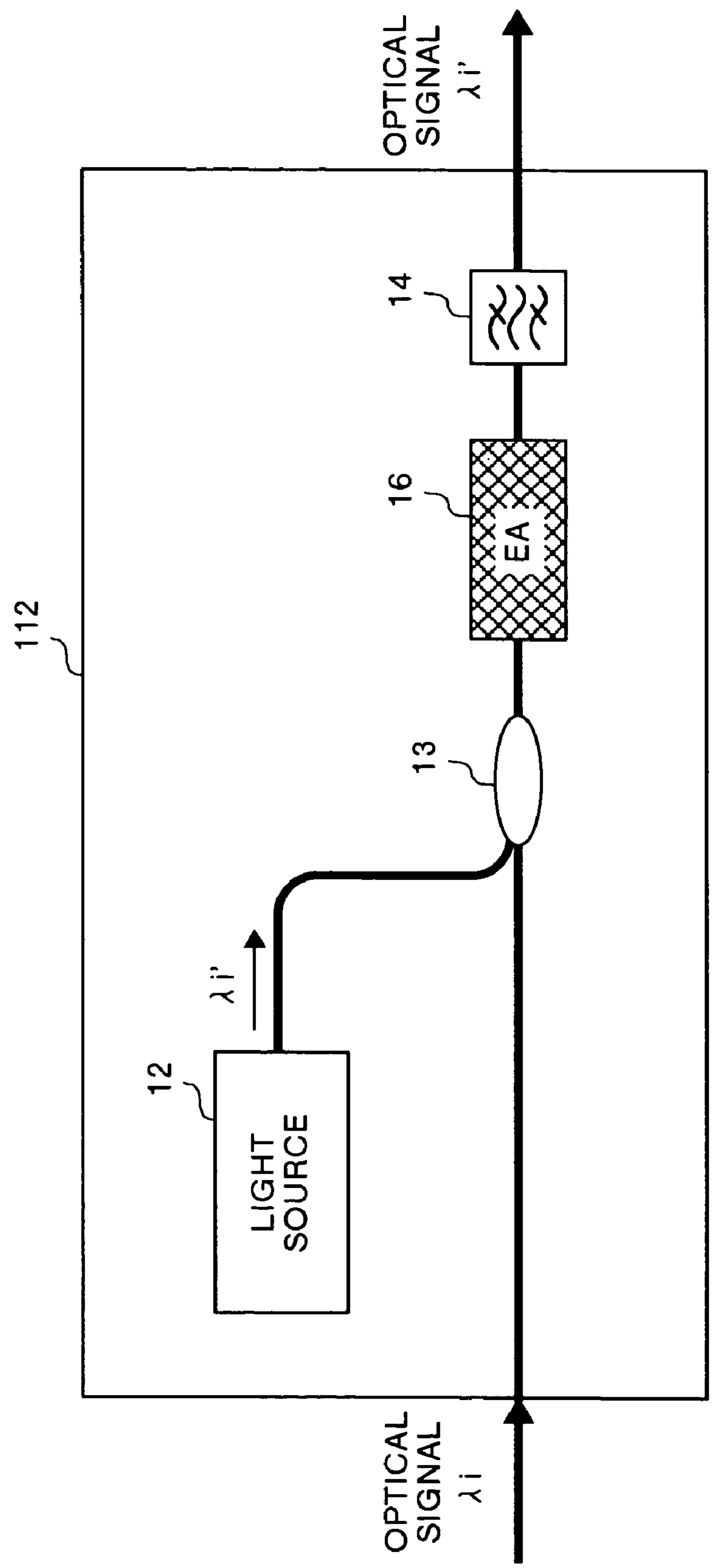
FIG. 11 is a block diagram of a wavelength converting element 112 according to an eighth embodiment of the invention.

FIG. 11 shows a wavelength converting element 112, that uses an electric field absorption type modulator, according to an eighth embodiment. This wavelength converting element 112 may be used in place of the wavelength converting element 105 in the sixth embodiment.

Legend 16 denotes the electric field absorption type modulator. The other elements are same as those shown in FIG. 10, therefore, their explanation will be omitted. An optical signal (wavelength: λi) and non-modulated probe light (wavelength: λi') from the light source 12 are combined in the photo-coupler 13, to strike the electric field absorption type modulator 16, where the probe light (wavelength: λi') is modulated by a mutual absorptive modulation effect of the modulator 16, and only the modulated probe light (wavelength: λi') is filtered by the optical filter 14, to be output.

Figure 12:
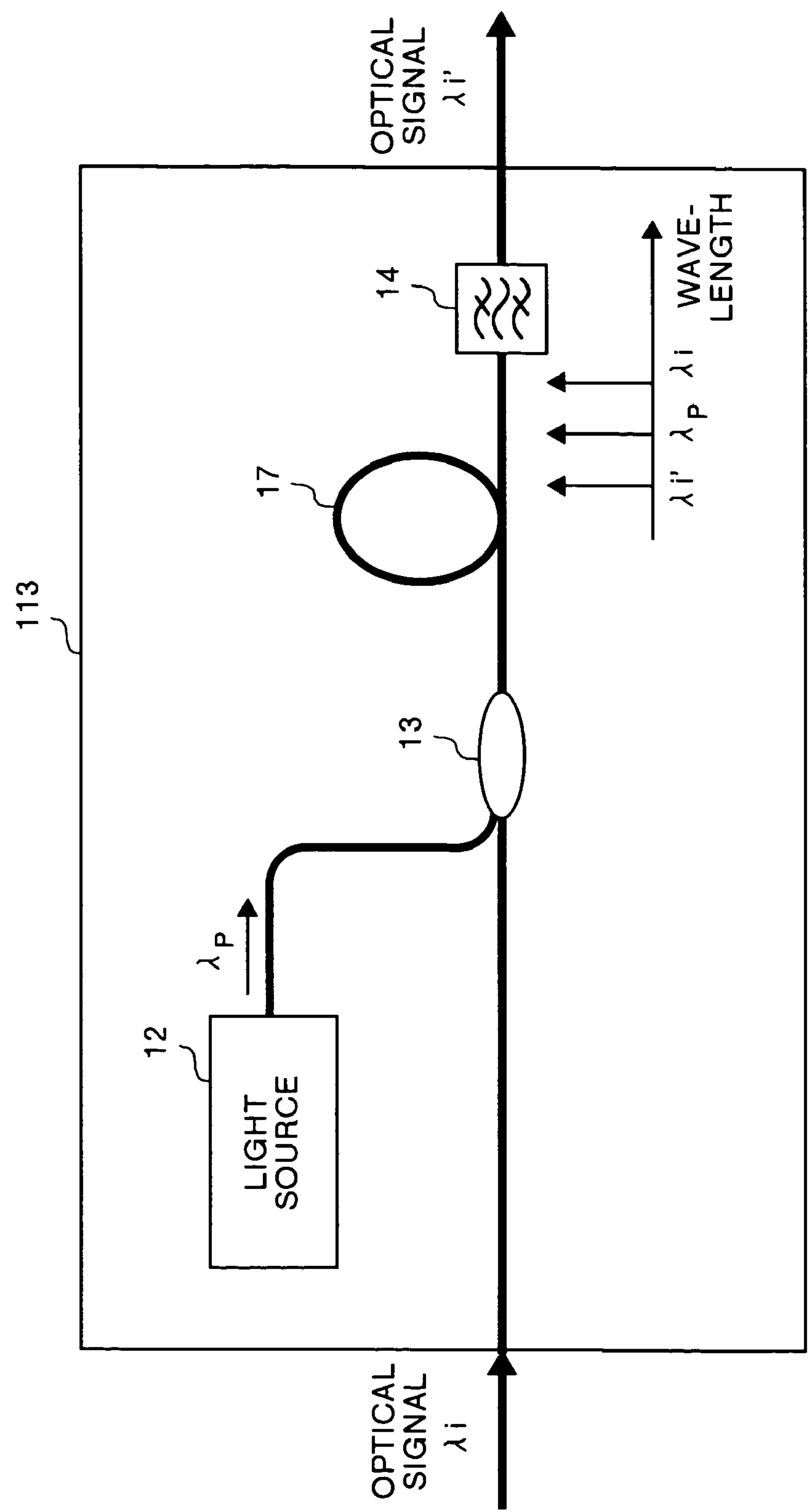
FIG. 12 is a block diagram of a wavelength converting element 113 according to a ninth embodiment of the invention.

FIG. 12 shows a wavelength converting element 113, that uses an optical fiber, according to a ninth embodiment. This wavelength converting element 113 may be used in place of the wavelength converting element 105 in the sixth embodiment.

Legend 17 denotes an optical fiber. The other elements are same as those shown in FIG. 10, therefore, their explanation will be omitted. An optical signal (wavelength: λi) input to the wavelength converting element 113 is combined at the photo-coupler 13 with excited light (wavelength: λp) from the light source 12, to strike the optical fiber 17, which then generates a new wavelength-converted optical signal (wavelength: λi') by way of a four-wave mixing. Only the wavelength-converted optical signal is filtered by the optical filter 14, to be output.

The following tenth to thirteenth embodiments are each addressed to a changing process in an optical repeater 1 (or optical repeaters 11, 21, 31, and 61), where wavelength intervals are changed from an even interval layout to an uneven interval layout, or from an uneven interval layout to an even interval layout.

The tenth embodiment corresponds to a case of changing the wavelength intervals in the optical repeater 1 from an even interval layout to an uneven interval layout.

Figures 13A, 13B:
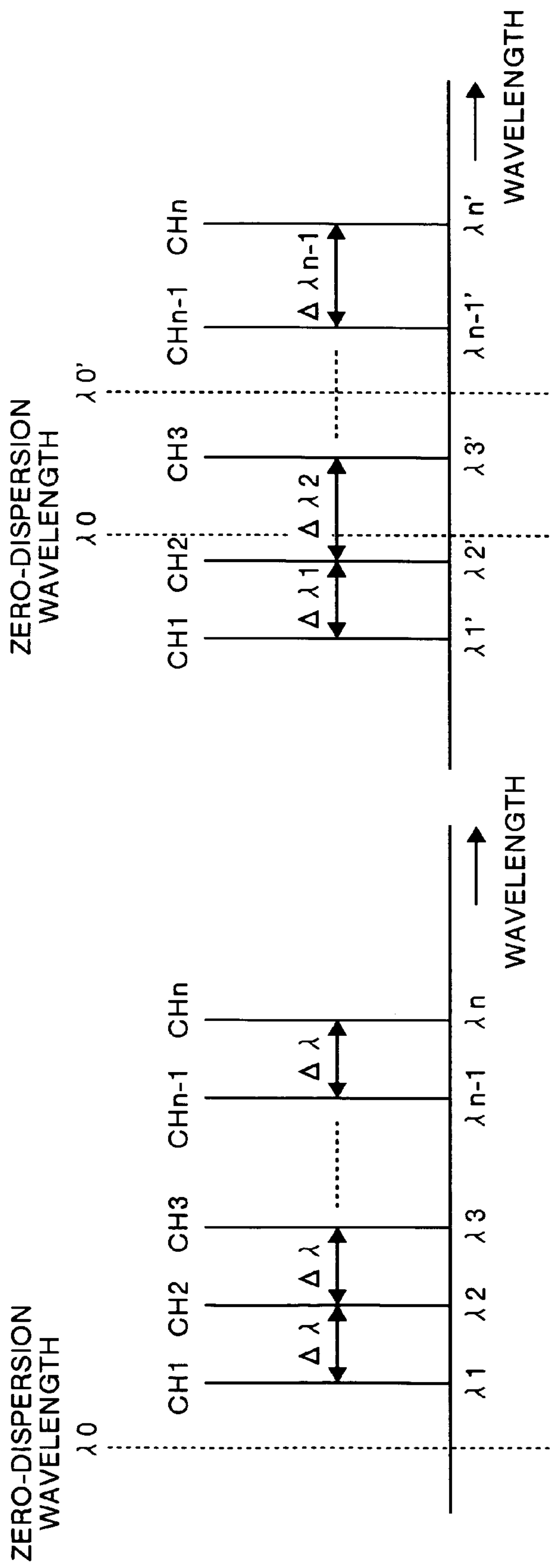
FIG. 13A and FIG. 13B are graphs of wavelength layout at an input and output side according to a tenth embodiment of the invention.

FIG. 13A and FIG. 13B show examples of wavelength layout in any of the optical repeaters 1, 11, 21, 31, and 61. FIG. 13A is a graph of wavelength layout of an optical input signal in the optical repeater provided with a wavelength converter. Relative to a zero-dispersion wavelength λ0 of an optical fiber, n waves having wavelengths λ1 to λn are laid out so that the SPM-GVD effect and FWM of their wavelengths are minimized.

FIG. 13B is a graph of wavelength layout of an optical output signal in the optical repeater provided with the wavelength converter. This signal is wavelength-converted so as to minimize the SPM-GVD effect and FWM relative to a zero-dispersion wavelength λ0' of an optical fiber, to have wavelengths laid out at uneven intervals.

The eleventh embodiment corresponds to a case of changing the wavelength intervals in the optical repeater from an uneven interval layout to an even interval layout.

Figures 14A, 14B:
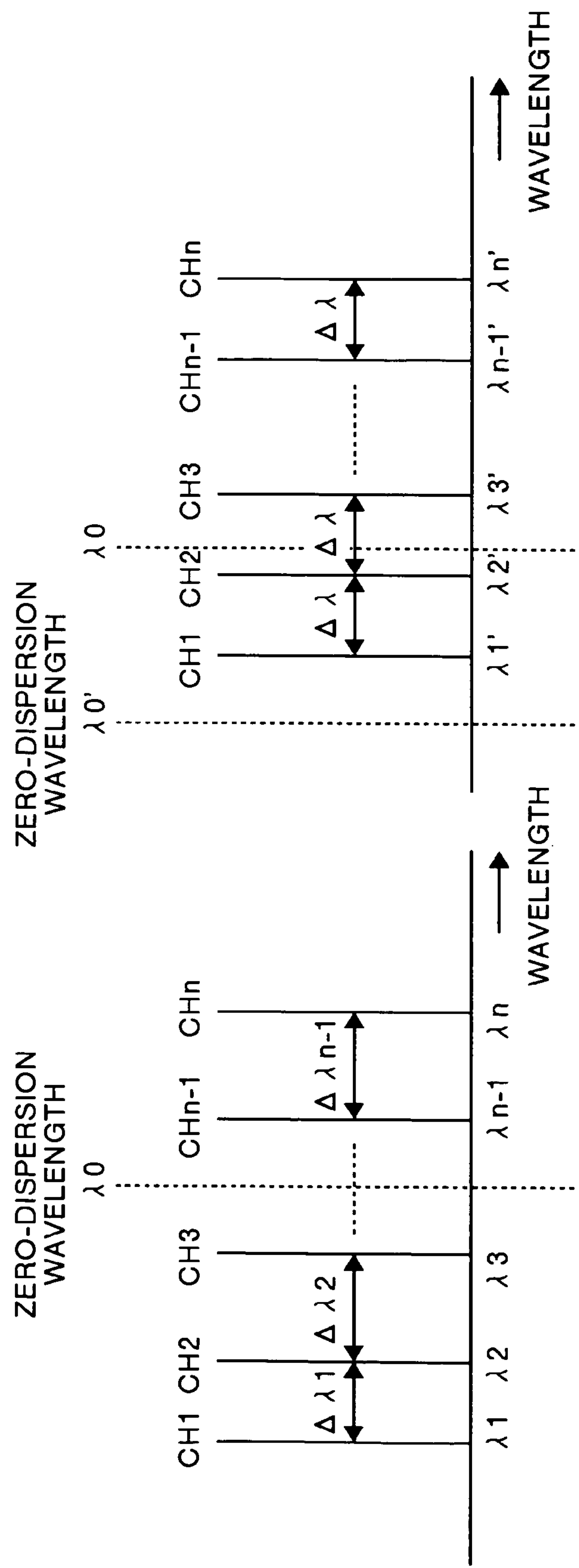
FIG. 14A and FIG. 14B are graphs of wavelength layout at an input and output side according to an eleventh embodiment of the invention.

FIG. 14A and FIG. 14B show examples of wavelength layout in the optical repeater. FIG. 14A is a graph of wavelength layout of an optical input signal in the optical repeater provided with a wavelength converter. Relative to a zero-dispersion wavelength λ0 of an optical fiber, n waves having wavelengths λ1 to λn are laid out at uneven intervals so that the SPM-GVD effect and FWM of their wavelengths are minimized.

FIG. 14B is a graph of wavelength layout of an optical output signal in the optical repeater provided with the wavelength converter. This signal is wavelength-converted so as to minimize the SPM-GVD effect and FWM relative to a zero-dispersion wavelength λ0' of an optical fiber, to have wavelengths laid out at even intervals.

The twelfth embodiment corresponds to a case of changing the wavelength intervals in the optical repeater from a constant value Δλ to another constant value Δλ'.

Figures 15A, 15B:
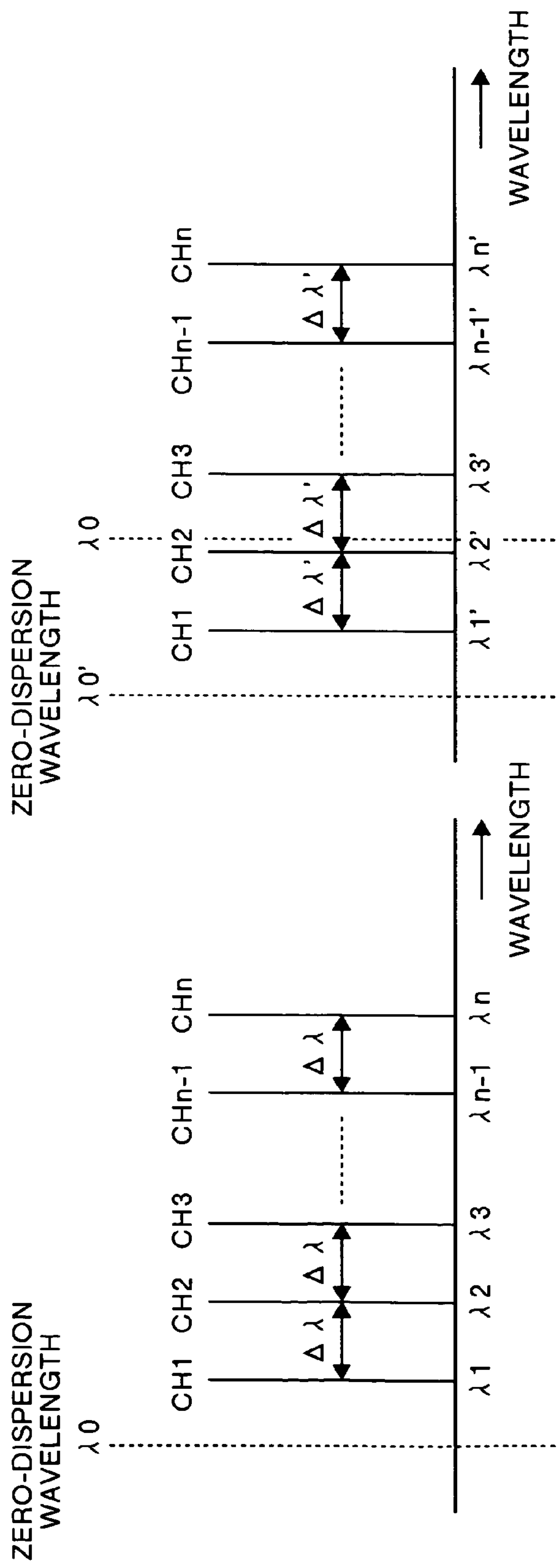
FIG. 15A and FIG. 15B are graphs of wavelength layout at an input and output side according to a twelfth embodiment of the invention.

FIG. 15A and FIG. 15B show examples of wavelength layout of the optical repeater. FIG. 15A is a graph of wavelength layout of an optical input signal in the optical repeater. Relative to a zero-dispersion wavelength λ0 of the optical fiber 2, n waves having wavelengths λ1 to λn are laid out at wavelength intervals of Δ1 so that the SPM-GVD effect and FWM of their wavelengths are minimized.

FIG. 15B is a graph of wavelength layout of an optical output signal in the optical repeater. This signal is wavelength-converted so as to minimize the SPM-GVD effect and FWM relative to a zero-dispersion wavelength λ0' of the optical fiber 3, to have wavelengths laid out at changed intervals of Δλ'.

The thirteenth embodiment corresponds to a case of changing the number of wavelengths in the optical repeater by a branching or insertion of wavelength.

Figures 16A, 16B:
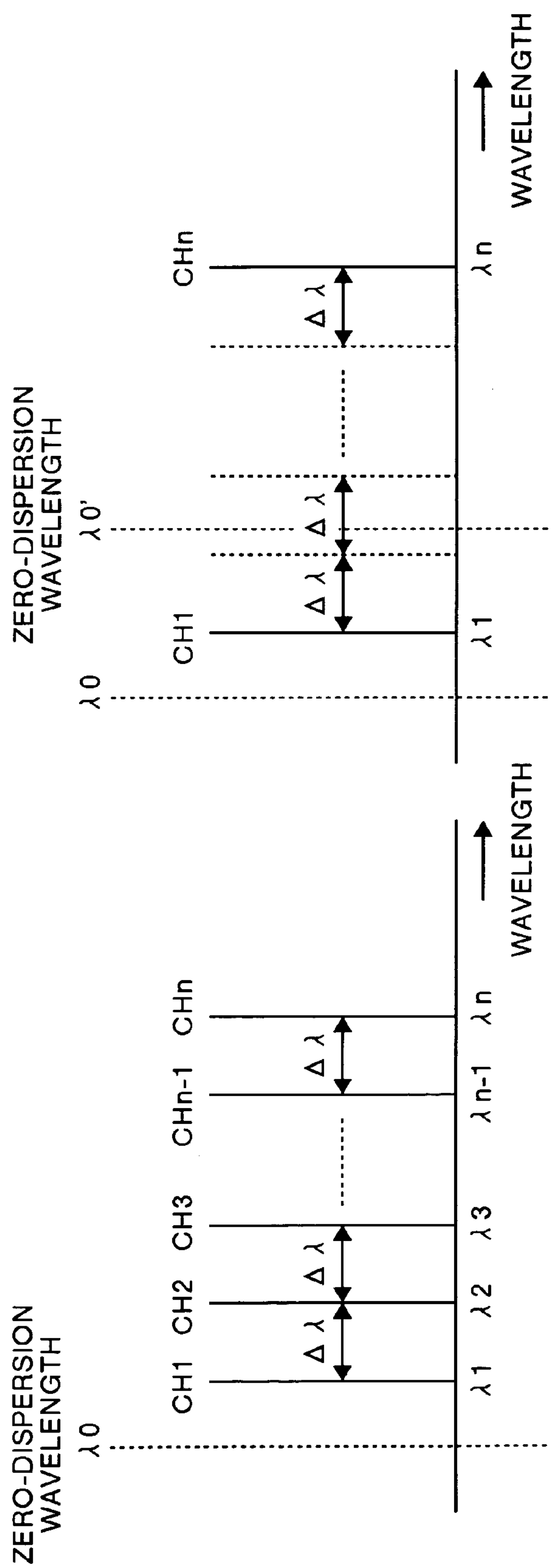
FIG. 16A and FIG. 16B are graphs of wavelength layout at an input and output side according to a thirteenth embodiment of the invention.
Figure 17:
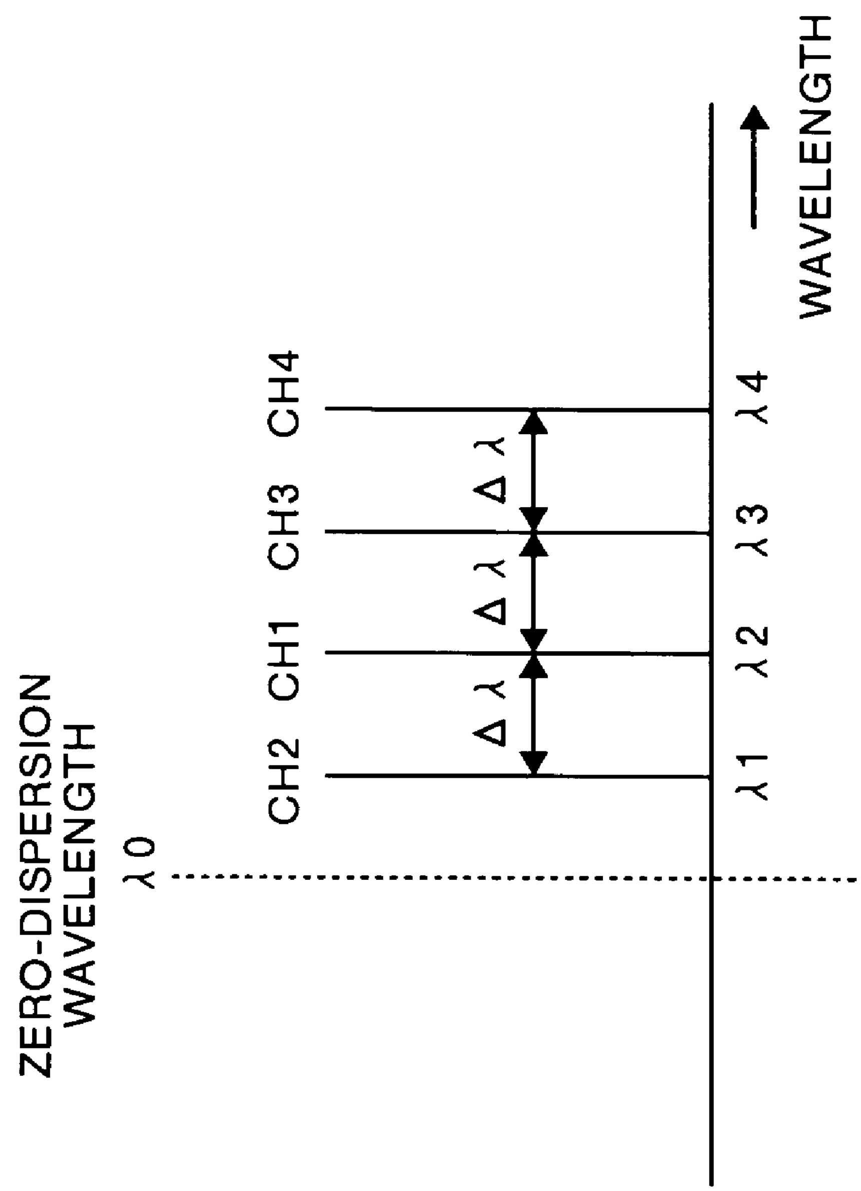
FIG. 17 is a graph of wavelength layout of a conventional example.

FIG. 16A and FIG. 16B show examples of wavelength layout of the optical repeater. FIG. 16A is a graph of wavelength layout of an optical input signal in the optical repeater. Relative to a zero-dispersion wavelength λ0 of the optical fiber 2, n waves having wavelengths λ1 to λn are laid out so that the SPM-GVD effect and FWM of their wavelengths are minimized.

FIG. 16B is a graph of wavelength layout of an optical output signal in the optical repeater. This signal is wavelength-converted to have wavelengths branched or inserted to be laid out so as to minimize the SPM-GVD effect and FWM relative to a zero-dispersion wavelength λ0' of the optical fiber 3.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An optical wavelength division multiplexing transmission system comprising:

a first optical fiber transmission path for a wavelength division multiplexed signal to be input therefrom, the first optical fiber transmission path having a first zero-dispersion wavelength, and the first wavelength division multiplexed signal having a first set of wavelengths;

a second optical fiber transmission path having a second zero-dispersion wavelength different from the first zero-dispersion wavelength;

and an optical repeater which receives the first wavelength division multiplexed signal from said first optical fiber transmission path, wavelength-converts the first wavelength division multiplexed signal with respect to respective wavelengths thereof so as to minimize SPM-GVD effect and FWM in the second optical fiber transmission path in accordance with the second zero-dispersion wavelength, and outputs a second wavelength division multiplexed signal having a second set of wavelengths to said second optical fiber transmission path wherein each of the wavelengths included in the second set of wavelengths is different from a corresponding wavelength included in the first set of wavelengths.

2. The optical wavelength division multiplexing transmission system according to claim 1, wherein said optical repeater is configured to shift, by a predetermined value, all wavelengths of the wavelength division multiplexed signal.

3. The optical wavelength division multiplexing transmission system according to claim 1, wherein said optical repeater is configured for wavelength intervals of the wavelength division multiplexed signal input from said first optical fiber transmission path to be in even intervals and for wavelength intervals of the wavelength division multiplexed signal output to said second optical fiber transmission path to be in uneven intervals.

4. The optical wavelength division multiplexing transmission system according to claim 1, wherein said optical repeater is configured for wavelength intervals of the wavelength division multiplexed signal input from said first optical fiber transmission path to be in uneven intervals and for wavelength intervals of the wavelength division multiplexed signal output to said second optical fiber transmission path to be in even intervals.

5. The optical wavelength division multiplexing transmission system according to claim 1, wherein said optical repeater is configured for wavelength intervals of the wavelength division multiplexed signal input from said first optical fiber transmission path to be a first constant value $\Delta\lambda$ and for wavelength intervals of the wavelength division multiplexed signal output to said second optical fiber transmission path to be a second constant value $\Delta\lambda'$.

6. The optical wavelength division multiplexing transmission system according to claim 1, wherein said optical repeater is configured for a number of wavelengths of the wavelength division multiplexed signal input from said first optical fiber transmission path to be a natural number n and for a number of wavelengths of the wavelength division multiplexed signal output to said second optical fiber transmission path to be a natural number m ($m \neq n$).

7. The optical wavelength division multiplexing transmission system according to claim 1, wherein said optical repeater comprises a non-linear element that performs the wavelength conversion.

8. The optical wavelength division multiplexing transmission system according to claim 1, wherein said optical repeater comprises one or more semiconductor optical amplifiers.

9. The optical wavelength division multiplexing transmission system according to claim 1, wherein said optical repeater comprises one or more electric field absorption type optical modulators and one or more light sources.

10. The optical wavelength division multiplexing transmission system according to claim 1, wherein said optical repeater comprises one or more light sources and an optical fiber having a non-linear optical effect.

11. An optical repeater, comprising:

a plurality of wavelength converters, each of the wavelength converters configured to receive an input wavelength signal included in a first wavelength division multiplexed signal having a first set of wavelengths, the first wavelength division multiplexed signal being transmitted through a first optical fiber transmission path having a first zero-dispersion wavelength, and each of the wavelength converters configured to output a corresponding output wavelength signal based on the input wavelength signal; and a wave combiner configured to receive the plurality of the output wavelength signals from said plurality of wavelength converters, the wave combiner configured to output a second wavelength division multiplexed signal having a second set of wavelengths based on the plurality of the output wavelength signals, to a second optical fiber transmission path to be connected to the wave combiner, wherein the second optical fiber transmission path has a second zero-dispersion wavelength different from the first zero-dispersion wavelength, each of the wavelengths included in the second set of wavelengths is different from a corresponding wavelength included in the first set of wavelengths, and the second wavelength division multiplexed signal is output to the second optical fiber transmission path so that an SPM-GVD effect and FWM are minimized relative to the second zero-dispersion wavelength.

12. The optical repeater of claim 11, further comprising a wavelength selector configured to receive an input wavelength division multiplexed signal and output the plurality of plurality of input wavelength signals to the plurality of wavelength converters.

13. The optical repeater of claim 11, further comprising:

a plurality of wavelength selectors corresponding to the plurality of wavelength converters, wherein each wavelength selector is configured to receive an input wavelength division multiplexed signal and output a particular input wavelength signal to the corresponding wavelength converter; and a wave divider configured to receive the input wavelength division multiplexed signal and output the same to said plurality of said wavelength selectors.

14. The optical repeater of claim 13, further comprising an optical amplifier configured to receive the output wavelength division multiplexed signal from said wave combiner and output a loss compensated output wavelength division multiplexed signal.

15. The optical repeater of claim 13, further comprising a plurality of optical amplifiers corresponding to said plurality of said wavelength converters wherein each optical amplifier is configured to receive the output wavelength signal from said corresponding wavelength converter and output a loss compensated output wavelength signal to said wave combiner.

16. The optical repeater of claim 15, further comprising an optical amplifier configured to receive the output wavelength division multiplexed signal from said wave combiner and output a loss compensated output wavelength division multiplexed signal.

17. The optical repeater of claim 11, wherein at least one wavelength converter comprises:

an opto-electrical converter configured to convert the input wavelength signal to an electrical signal; and an electro-optical converter configured to convert the electrical signal from the opto-electrical converter to the output wavelength signal, wherein a wavelength of the input wavelength signal is different from a wavelength of the output wavelength signal.

18. The optical repeater of claim 17, wherein said opto-electrical converter is one of a photo-diode, an avalanche photo-diode, and a photo-counter.

19. The optical repeater of claim 17, wherein said electro-optical converter is a semiconductor laser.

20. The optical repeater of claim 11, wherein at least one wavelength converter comprises:

a light source configured to output a pumplight;

a photo-coupler configured to receive the pumplight and the input wavelength signal and output a combined light;

a semiconductor optical amplifier configured to receive the combined light and output a wavelength-converted optical signal based on the input wavelength signal; and an optical filter configured to receive the wavelength-converted optical signal and output the output wavelength signal, wherein a wavelength of the input wavelength signal is different from a wavelength of the output wavelength signal.

21. The optical repeater of claim 20, wherein said semiconductor optical amplifier is configured to generate the wavelength-converted optical signal through four-wave mixing.

22. The optical repeater of claim 11, wherein at least one wavelength converter comprises:

a light source configured to output a non-modulated probe light with a wavelength equal to the wavelength of the output wavelength signal;

a photo-coupler configured to receive the non-modulated probe light and the input wavelength signal and output a combined light;

an electric field absorption type modulator configured to receive the combined light and output a modulated probe light based on the input wavelength signal; and an optical filter configured to receive the modulated probe light and output the output wavelength signal.

23. The optical repeater of claim 22, wherein the electric field absorption type modulator is configured to modulate the non-modulated probe light by a mutual absorptive modulation effect.

24. The optical repeater of claim 11, wherein at least one wavelength converter comprises:

a light source configured to output a pumplight;

a photo-coupler configured to receive the pumplight and the input wavelength signal and output a combined light;

an optical fiber configured to receive the combined light and output a wavelength-converted optical signal based on the input wavelength signal; and an optical filter configured to receive the wavelength-converted optical signal and output the output wavelength signal, wherein a wavelength of the input wavelength signal is different from a wavelength of the output wavelength signal.

25. The optical repeater of claim 20, wherein said optical fiber of said wavelength converter is configured to generate the wavelength-converted optical signal through four-wave mixing.

* * * * *